United States Patent [19]

Utsuno et al.

[11] Patent Number: 5,231,783
[45] Date of Patent: Aug. 3, 1993

[54] METHOD OF MAKING FISHING ROD AND FISHING ROD MADE BY THE METHOD

[75] Inventors: Nobuyoshi Utsuno; Norio Hamayasu, both of Sakai, Japan

[73] Assignee: Shimano, Inc., Osaka, Japan

[21] Appl. No.: 802,198

[22] Filed: Dec. 4, 1991

[30] Foreign Application Priority Data

Dec. 11, 1990 [JP] Japan .................. 2-401326
Jun. 4, 1991 [JP] Japan .................. 3-132707

[51] Int. Cl.⁵ .............................. B32B 31/04
[52] U.S. Cl. .................... 43/18.5; 156/84;
156/85; 156/86; 156/184; 156/185; 156/186;
156/187; 156/188; 156/189; 156/192; 156/195
[58] Field of Search ............ 156/184, 185, 186, 187,
156/188, 189, 192, 195, 264, 265, 84, 85, 86;
43/18, 18.5

[56] References Cited

U.S. PATENT DOCUMENTS

| | | | |
|---|---|---|---|
| 2,854,031 | 9/1958 | Donaldson | 156/187 |
| 3,420,722 | 1/1969 | McNulty et al. | 156/195 |
| 3,810,803 | 5/1974 | Karp et al. | 156/195 |
| 4,133,708 | 1/1979 | Tokund | 156/192 |
| 5,076,871 | 12/1991 | Freye et al. | |

FOREIGN PATENT DOCUMENTS

| | | | |
|---|---|---|---|
| 0004957 | 2/1973 | Japan | 156/192 |
| 203428 | 10/1985 | Japan | 156/192 |
| 61-121933 | 6/1986 | Japan . | |
| 1-113226 | 5/1989 | Japan . | |

*Primary Examiner*—Caleb Weston
*Attorney, Agent, or Firm*—Dickstein, Shapiro & Morin

[57] ABSTRACT

A method of making a pipe-like member such as a fishing rod and a golf club is disclosed. According to the method, a tape-like prepreg is formed by overlaying each other a first fiber layer comprised of fibers aligned along a longitudinal direction of the layer and a second fiber layer comprised of fibers aligned in a direction substantially normal to the fiber alignment direction of the first fiber layer. Then, the tape-like prepreg is wound about a mandrel with a turn of the prepreg being widthwise overlapped with an adjacent turn of the prepreg. Thereafter, the assembly is sintered.

14 Claims, 6 Drawing Sheets

METHOD OF MAKING FISHING ROD AND FISHING ROD MADE BY THE METHOD

BACKGROUND OF THE INVENTION

1. Field of the Invention

The present invention relates to a method of making a pipe-like member incorporating a reinforcing fiber layer for use in e.g. a fishing rod, a shaft of a golf club or the like and the invention also relates to such pipe-like member made by the method.

2. Description of the Related Art

Conventionally, a pipe-like member of the above-described type incorporating a reinforcing fiber layer is formed by winding about a mandrel a plurality of prepreg sheets each comprised of fibers aligned in a predetermined direction in such a manner as to arrange the fiber extending directions of the sheets normal to each other and then sintering this assembly.

With the above-described manufacturing process of the pipe-like member, the method requires that the prepreg sheets be cut in advance according to a desired diameter and length of the pipe-like member to be made. In short, according to this conventional method, the prepreg sheets must be cut in advance and this cutting of the prepreg sheets must be done in accordance with the dimensions of the target pipe-like member.

In winding the prepreg sheets about the mandrel, it is desired that the winding operation take place with applying a significant force (e.g. a tensional force) between adjacent prepreg layers. However, because the prepreg in the form of sheet has a large contact area, it is difficult to apply such large force to the adjacent sheets.

Further, in the course of the winding operation of the prepreg sheets, an air gap may be formed between the wound layers. Then, if the assembly is sintered with such air gap, the air layer remains as voids which deteriorates the strength of the finished pipe-like member.

The primary object of the present invention is to provide an improved method of making a pipe-like member, which method requires fewer steps than the conventional method regardless of the diameter and length of the member to be made yet can provide the member with higher strength.

SUMMARY OF THE INVENTION

For accomplishing the above-noted object, a method, relating to the present invention, of making a pipe-like member, comprises the steps of:

forming a tape-like prepreg by overlaying each other a first fiber layer comprised of fibers aligned along a longitudinal direction of said layer and a second fiber layer comprised of fibers aligned in a direction substantially normal to said fiber alignment direction of the first fiber layer;

winding said tape-like prepreg about a mandrel with a turn of the prepreg being widthwise overlapped with an adjacent turn of the prepreg; and sintering the assembly obtained from said steps.

Functions and effects of the above features will be described next.

The method can be embodied as shown in FIGS. 1 through 4 for example. As the prepreg P in the form of a tape is wound about a mandrel 3, with application of a tension to this prepreg being wound, it is possible to obtain a sufficient pressure contact force for the prepreg even if the applied tension is relatively small. Further, since the prepreg tape has a smaller width than the prepreg sheet used in the convention, an air gap will hardly be formed between the adjacent turns of the prepreg tape. Moreover, even if such air gap should be formed, thermal expansion of the air gap in the course of the sintering operation will advantageously cause the air content to escape along the width of the tape out of the prepreg P.

Figure 7:
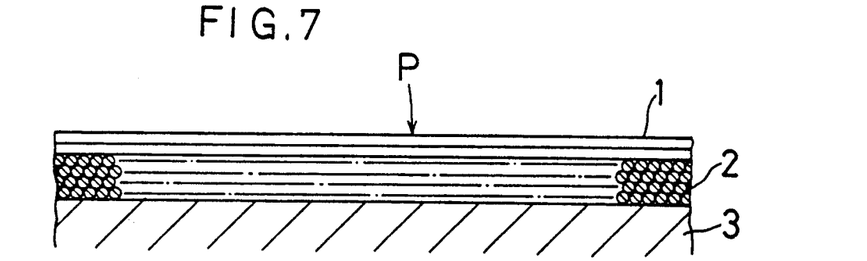
FIG. 7 is a section showing a winding of a prepreg according to a conventional method for comparison with the method of the present invention.
Figure 8:
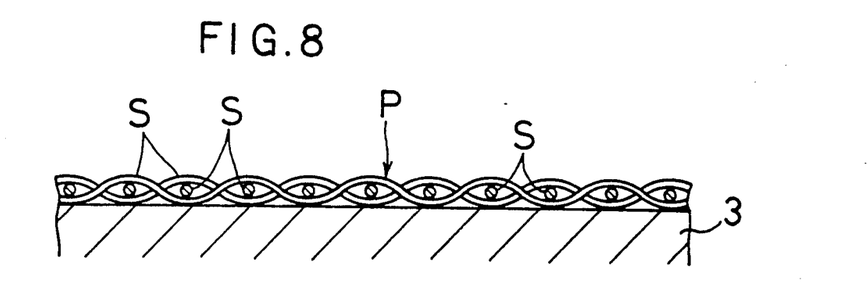
FIG. 8 is a section for comparison for showing a wound condition of a cloth type prepreg.

Incidentally, although it is conceivable to cut a cloth (fiber) sheet type prepreg P into a tape-like shape, as shown in FIG. 8 provided for comparison, even if a significant pressure is applied to this prepreg in the course of the sintering operation, air gaps tend to be formed as voids in the fiber tissues and between the tissue and the mandrel. Further, as shown in FIG. 7, this construction is inferior to that afforded by the present invention because of lower density of the fiber tissue.

That is, according to the present invention, the pipe-like member is formed by winding of the prepreg in the form of tape, such that it becomes possible to make pipe-like members of various diameters and/or lengths only through selection of the configuration of the mandrel about which the prepreg tape is wound. Further, the method of the present invention can effectively prevent generation of voids because sufficient pressure contact force is readily available in the course of the winding step without using any special means for providing such force.

Consequently, the invention has achieved its primary object of providing an improved method of making a pipe-like member, which method requires fewer steps than the conventional method regardless of the diameter and length of the member to be made yet can provide the member with higher strength.

Figures 5, 6:
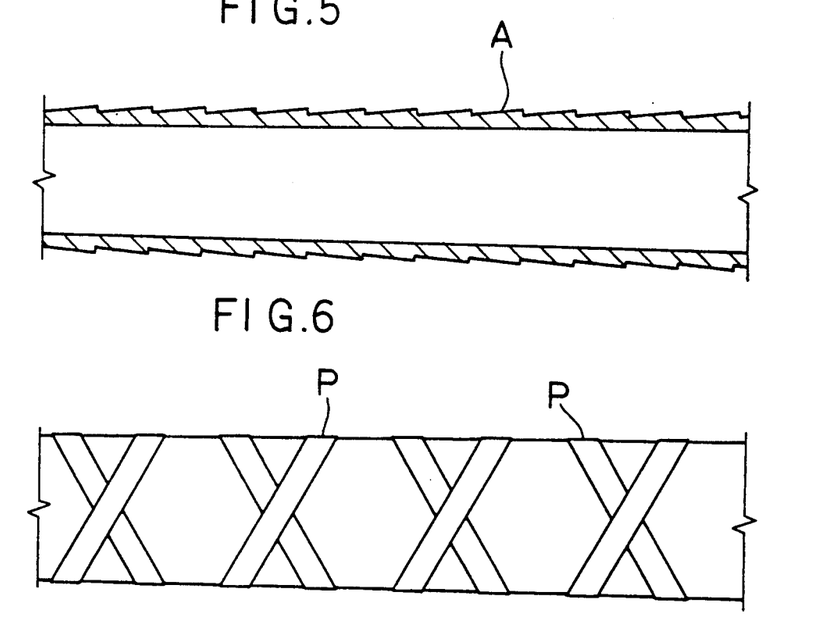
FIG. 5 is a section of a pipe-like member after being sintered.
FIG. 6 is a side view of a pipe-like member made by a method according to a further embodiment of the invention.

In particular, as shown in FIG. 5, with the method of the invention, there are formed steps on the outer periphery of the finished pipe-like member, which is suitable for use as a fishing rod because the steps serve as anti-slip means for an angler's hand gripping this rod.

In case a traverse winding portion is to be formed on a longitudinally intermediate portion of the fishing rod as shown in FIG. 6, a different prepreg tape than that used for forming the rod body is wound by a greater turning pitch, so that unevenness is formed on the outer periphery of the rod. This unevenness is effective for restricting sticking of a wet fishing line to the rod surface.

Further, and other objects, features and effects of the invention will become more apparent from the following more detailed description of the embodiments of the invention with reference to the accompanying drawings.

DESCRIPTION OF THE PREFERRED EMBODIMENTS

Preferred embodiments of a method of making a pipe-like member and a pipe-like member made by the method relating to the present invention will now be described in detail with reference to the accompanying drawings.

FIGS. 1 through 5 illustrate a method according to one preferred embodiment of the present invention for making a pipe-like member A for use in e.g. a fishing rod.

Figure 1:
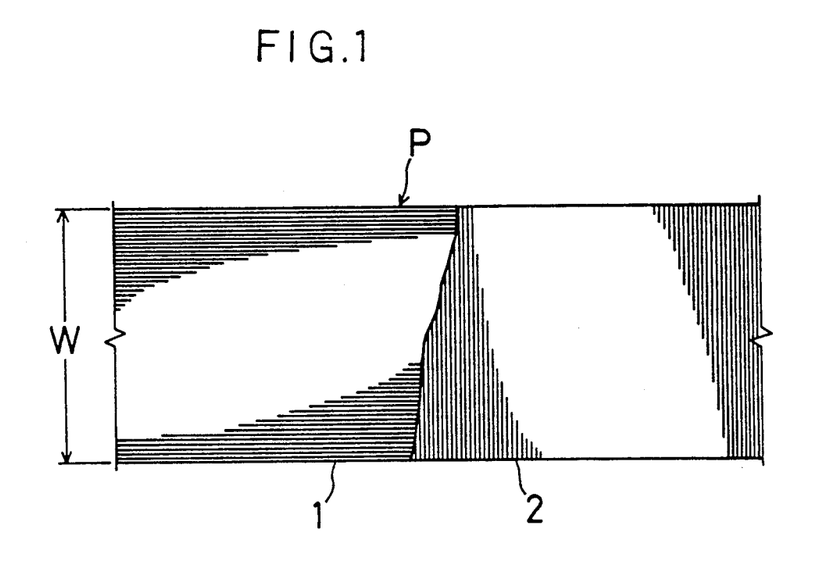
FIG. 1 is a front view of a prepreg in the form of a tape.
Figure 2:
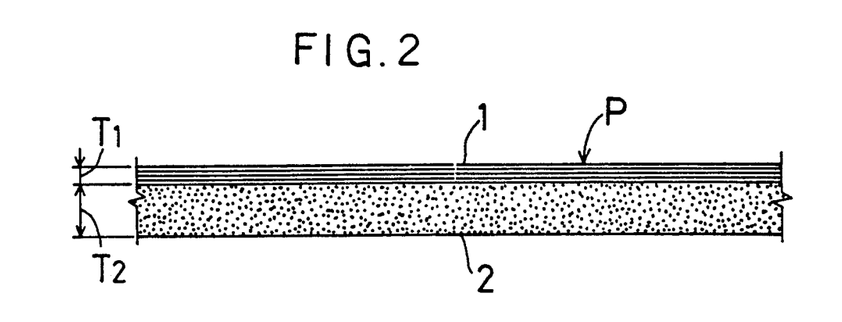
FIG. 2 is a side view in vertical section of the prepreg tape.

As shown in FIGS. 1 and 2, this method employs a first fiber layer 1 comprised of fibers aligned along a longitudinal direction of the layer and a second fiber layer 2 comprised of fibers aligned in a direction substantially normal to the fiber alignment direction of the first fiber layer 1, with the first fiber layer and the second fiber layer being overlaid on each other. Then, this assembly is impregnated with a thermosetting resin such as an epoxy resin to be formed into a tape-like prepreg P.

This prepreg P having a width W of 15 mm is so prepared that the first fiber layer 1 has a thickness T1 of 0.03 mm and the second fiber layer 2 has a thickness T2 of 0.2 to 0.7 mm, respectively. Further, these layers 1, 2 are formed of such fiber material as glass fiber, carbon fiber or the like.

Figure 3:
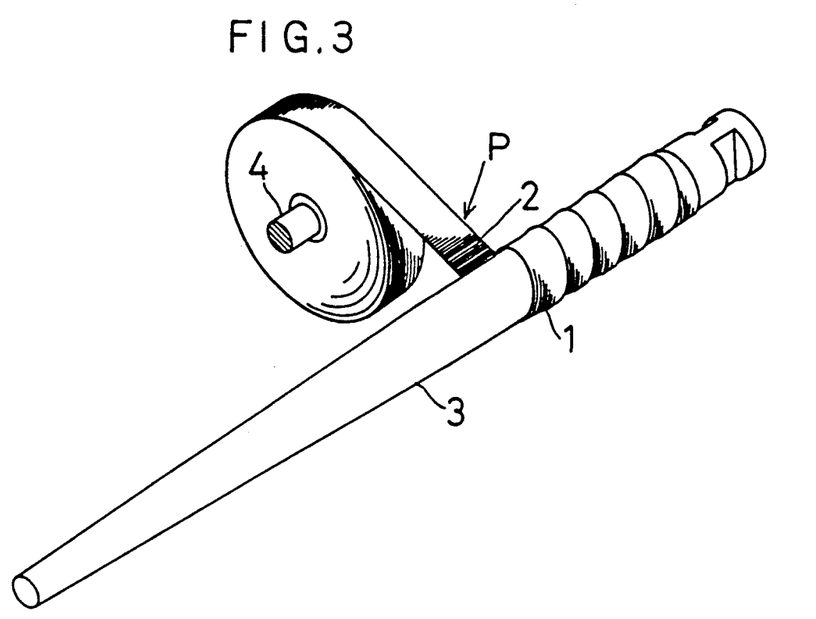
FIG. 3 is a perspective view illustrating a winding of the prepreg tape about a mandrel.

Then, as shown in FIG. 3, the above-described prepreg P is wound about a mandrel 3 with a turn of the prepreg being widthwise overlapped with an adjacent turn of the prepreg.

In the course of this winding operation, an appropriate measure such as application of a braking force to a rotary support shaft 4 for the tape is taken so as to cause the prepreg tape P to contact the mandrel 3 with an appropriate amount of contact pressure.

Figure 4:
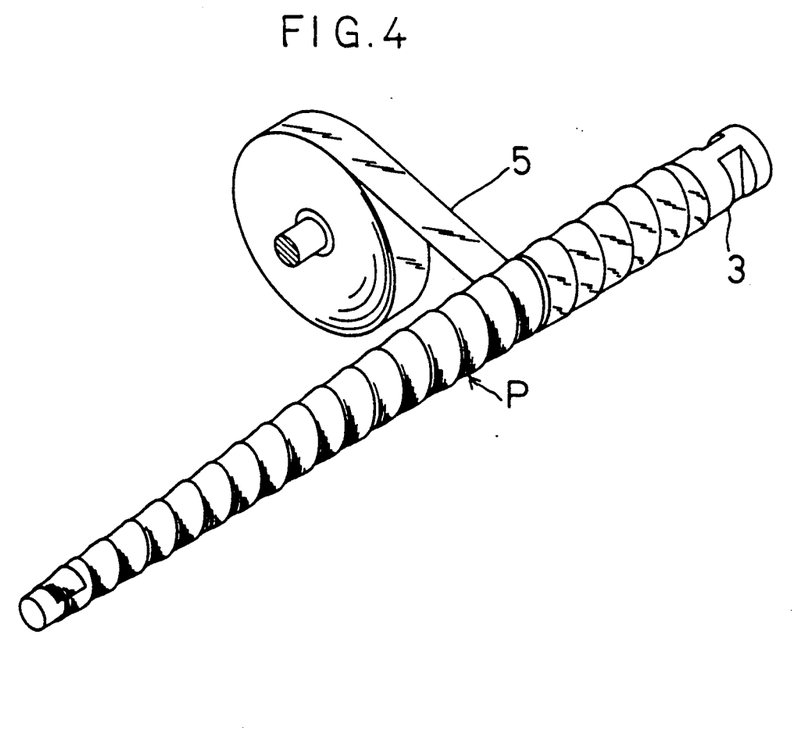
FIG. 4 is a perspective view illustrating an overlayered winding of the prepreg tape.

Thereafter, as illustrated in FIG. 4, on an upper surface of the wound prepreg P, a heat-contracting type tape 5 is wound and then this assembly is sintered.

In the course of the above sintering operation, the thermal contraction of the tape 5 compresses the prepreg 5 and also the application of the heat serves to integrate the resin of the overlapped turns of the prepreg P.

Then, the mandrel 3 is withdrawn from the assembly and the tape 5 is removed. And, the opposed terminal ends of this assembly are cut away to provide a pipe-like member A having a cross section shown in FIG. 5.

FIG. 6 shows a construction obtained according to a method of a further embodiment. In this construction, the prepreg tape is wound in a traverse, i.e. cross pattern to obtain a better hand-gripping performance.

A further embodiment of the method of the invention will be described next with reference to FIGS. 9 through 13.

Figure 9:
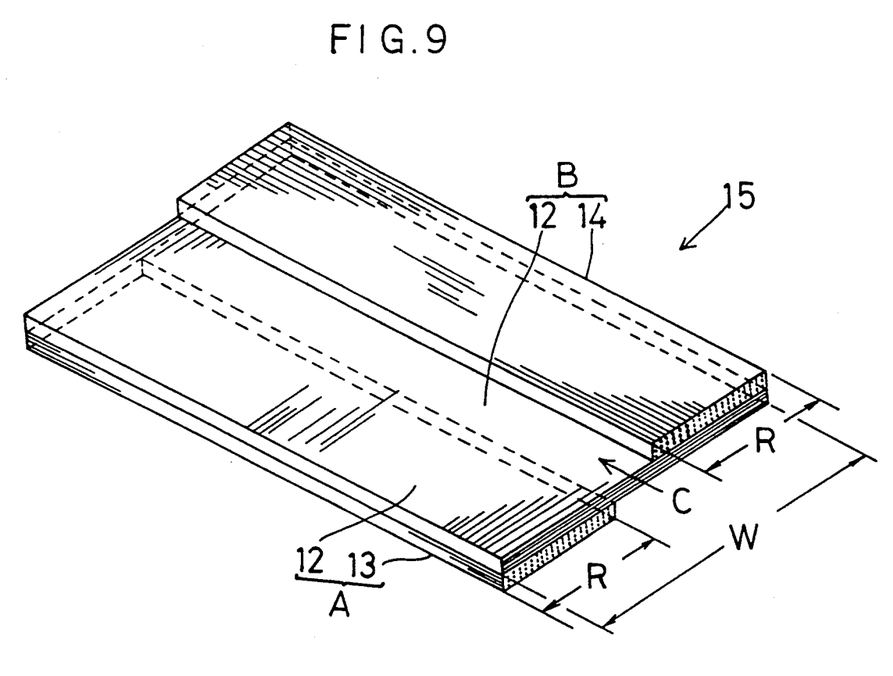
FIG. 9 is a perspective view showing a prepreg tape according to a further embodiment of the present invention.

(a) From a prepreg sheet, there are cut a plurality of prepreg strips each having a predetermined width shorter than a length of an entire fishing rod as a pipe-like member to be made. Then, these strips are bonded to each other to obtain a prepreg tape base 12. The reinforcing fiber forming the prepreg has its extending direction aligned with the width of the tape base 12.

(b) From the prepreg sheet, there are cut a plurality of further prepreg strips each having a predetermined width shorter than the width of the tape base 12. Then, these prepreg strips are bonded to each other to obtain a prepreg tape reinforcing element 13. In this case, the reinforcing fiber has its extending direction aligned with the longitudinal direction of the prepreg tape reinforcing element 13.

(c) The prepreg tape reinforcing element 13 is laid over the prepreg tape base 12 with the element 13 and the base 12 being longitudinally aligned to each other to obtain a tape 15 for forming a pipe-like member.

Figure 10:
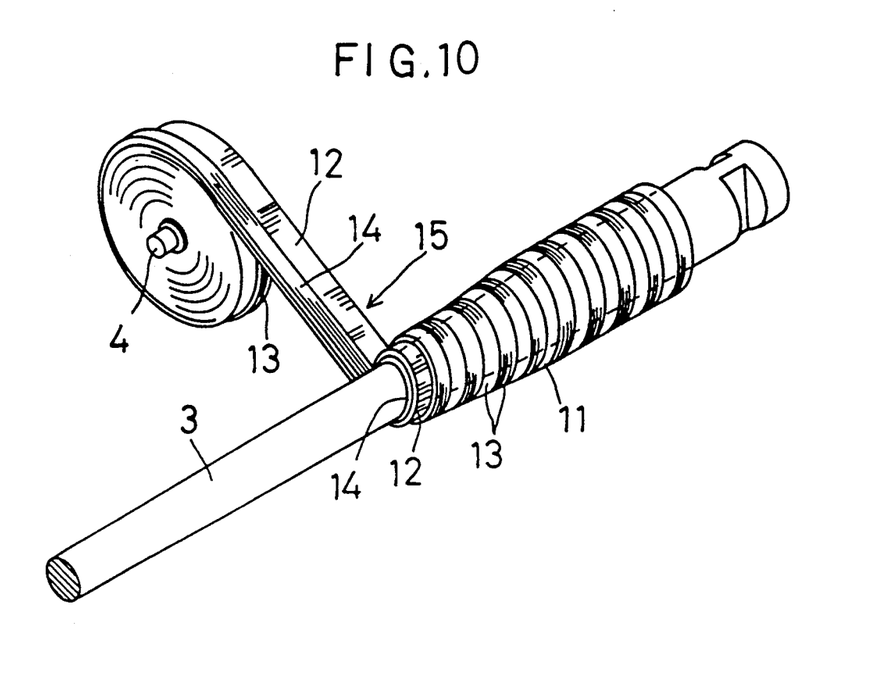
FIG. 10 is a perspective view illustrating a winding of the tape of FIG. 9 about a mandrel.

(d) The pipe-like member forming tape 15 is wound about the mandrel 3 in a spiral pattern with the alignment direction of the reinforcing fiber of the prepreg tape base 12 being slightly inclined relative to the axis of the mandrel 3. In the course of this winding operation, a subsequent overlapping portion of the tape 15 is overlapped on a foregoing non-overlapped portion of the tape 15.

(e) Thereafter, the assembly is sintered.

According to the above-described method, the prepreg sheet is cut into the strips each having the width shorter than the length of the entire rod. Thus, there will be produced fewer strips having lengths shorter than the necessary length. As a result, the method can achieve improvement in the yield. Also, the cutting patterns are limited to the two types for the prepreg tape base and the prepreg tape reinforcing element, such that this method can achieve improvement in efficiency in this respect as well.

Moreover, in winding the pipe-like member forming tape about the mandrel, since this tape has the width shorter than the length of the entire pipe-like member, the application of the tension can take place evenly, thus effectively restricting generation of voids. Further, the multi-layered pipe-like member can be formed by the single step of winding the pipe-like member forming tape about the mandrel.

Consequently, according to this method, the manufacturing costs can be reduced due to the improvement in the yield and the generation of voids can be very effectively restricted by the use of the relatively narrow pipe-like member forming tape which can readily follow the round contour of the mandrel. Moreover, this method allows various design changes to be readily made depending on the necessity, such as of increasing the overlapping amount of the tape at a portion such as the opened terminal end of the pipe-like member which portion is more subject to cracking while decreasing the overlapping amount at the other portions.

A method of a still further embodiment of the invention will be described next.

(a) From a prepreg sheet, there are cut a plurality of prepreg strips each having a predetermined width W shorter than a length of an entire fishing rod as a pipe-like member to be made. Then, these strips are bonded to each other to obtain a prepreg tape base 12. The reinforcing fiber forming the prepreg has its extending direction aligned with the width of the tape base 12.

(b) From the prepreg sheet, there are cut a first prepreg strip and a second prepreg strip both having a predetermined width R shorter than the width W of the tape base 12. Then, these first and second prepreg strips are bonded to each other to obtain first and second prepreg tape reinforcing elements 13, 14. The reinforcing fiber has its extending direction aligned with the longitudinal direction of the prepreg tape reinforcing elements 13, 14.

(c) The first prepreg tape reinforcing element 13 is laid over an inner peripheral surface of the prepreg tape base 12 and the second prepreg tape reinforcing element 14 is laid over an outer peripheral surface of the base 12 so that the elements 13, 14 are longitudinally aligned with the base 12 and further that the first prepreg tape reinforcing element 13 and the second prepreg tape reinforcing element 14 are displaced respectively to the opposed ends of the prepreg tape base 12, thereby to form a pipe-like member forming tape 15.

(d) Then, this pipe-like member forming tape 15 is wound about the mandrel 3 in a spiral pattern with the alignment direction of the reinforcing fiber of the prepreg tape base 12 being slightly inclined relative to the axis of the mandrel 3. In the course of this winding operation, a subsequent overlapping portion B of the tape 15 is overlapped on a foregoing non-overlapped portion A of the tape 15.

(e) Thereafter, the assembly is sintered.

According to the above-described method, at the lowermost layer of the multi-laid assembly, the extending direction of the reinforcing fiber is aligned along the peripheral direction of the pipe-like member so as to increase resistance against cracking. Further, at the upper layers of the assembly, the extending directions of the reinforcing fibers of these layers are oriented to perpendicularly cross each other so as to increase the strength against crushing. Accordingly, this method can eliminate the common practice of affixing a reinforcing pattern to a specific limited area(s) in the inner layer of the multi-laid prepreg.

A method of making a rod member 11 as a pipe-like member will be specifically described next with reference to FIGS. 9 and 10.

(a) From a prepreg sheet formed by a unidirectionally aligned reinforcing fiber impregnated with a thermosetting resin such as an epoxy rein, there is cut a prepreg tape base 12 having a predetermined width W shorter than a total length of the rod member 11 to be made. The reinforcing fiber has its extending direction aligned with the width of the prepreg tape base 12. Incidentally, this width W of the prepreg tape base 12 is about 15 mm.

(b) From the prepreg sheet, there are cut a first prepreg tape reinforcing element 13 and a second prepreg tape reinforcing element 14 both having a predetermined width R shorter than the width W of the tape base 12. The reinforcing fiber has its extending direction aligned with the longitudinal direction of the prepreg tape reinforcing elements 13, 14 and the fiber has a thickness shorter than the thickness of the prepreg tape base 12.

(c) The first prepreg tape reinforcing element 13 is laid over an inner peripheral surface of the prepreg tape base 12 and the second prepreg tape reinforcing element 14 is laid over an outer peripheral surface of the base 12 so that the elements 13, 14 are longitudinally aligned with the base 12 and further that the first prepreg tape reinforcing element 13 and the second prepreg tape reinforcing element 14 are displaced respectively to the opposed ends of the prepreg tape base 12, thereby to form a pipe-like member forming tape 15. Further, in this pipe-like member forming prepreg tape 15, there are formed a first overlapping portion A where the first prepreg tape reinforcing element 13 is overlapped with the second prepreg tape reinforcing element 14 and a second overlapping portion B where the second prepreg tape reinforcing element 14 is overlapped with the prepreg tape base 12.

The width R of the first and second prepreg tape reinforcing elements 13, 14 is set shorter than half of the width W. Also, in the pipe-like member forming tape 15, a portion C other than the first and second overlapping portions A, B is reserved. At this portion C, the tape base 12 is exposed without being overlapped by the first or second tape reinforcing element. Accordingly, in winding the tape 15 about the mandrel 3, this portion C can be readily deformed along the side edges of the previously wound turns of the reinforcing elements 13, 14.

Figure 11:
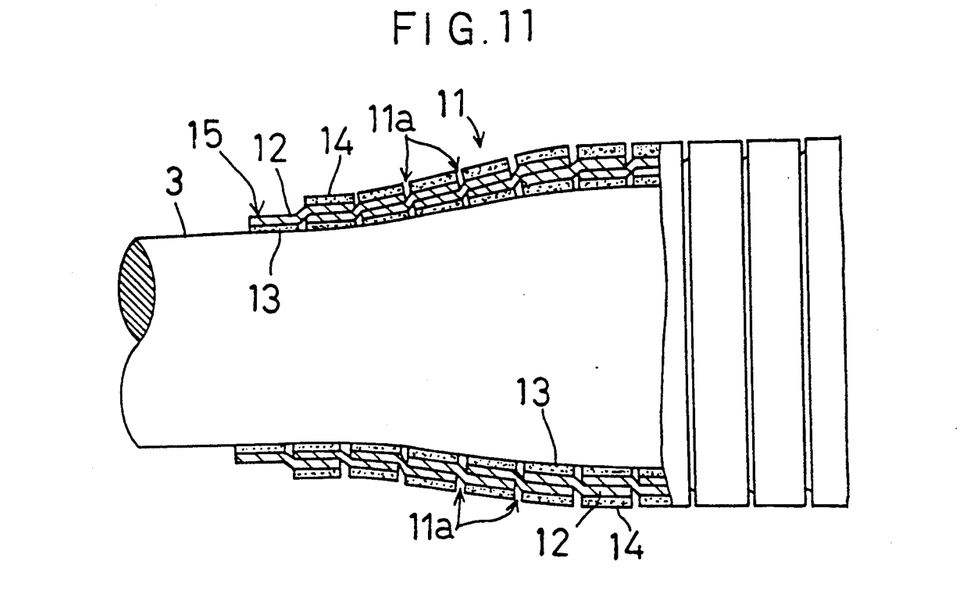
FIG. 11 is a side view in vertical section illustrating the tape of FIG. 9 wound about the mandrel.

(d) Then, as illustrated in FIGS. 10 and 11, this pipe-like member forming tape 15 is wound about the mandrel 3 in a spiral pattern with the alignment direction of the reinforcing fiber of the prepreg tape base 12 being slightly inclined relative to the axis of the mandrel 3. In the course of this winding operation, a subsequent overlapping portion B of the tape 15 is overlapped on a foregoing non-overlapped portion A of the tape 15.

Further, during the winding operation, an appropriate measure such as application of a braking force to the rotary support shaft 4 for the tape is taken so as to cause the tape 15 to contact the mandrel 3 with an appropriate amount of contact pressure.

Figure 12:
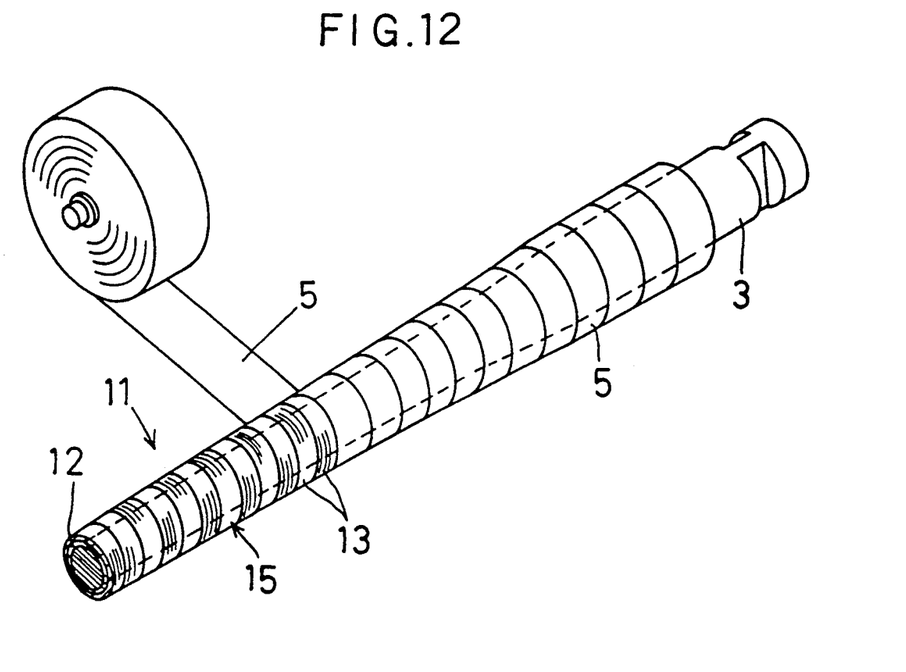
FIG. 12 is a perspective view showing a overlayered winding of the tape of FIG. 9 onto a wound tape.

(e) Thereafter, as illustrated in FIG. 12, on an upper surface of the wound tape 15, the heat-contracting type tape 5 is wound and then this assembly is sintered.

According to the above-described method, it is possible to form recesses 11a in the fishing rod 11 formed by the winding of the tape 15, so that the unevenness by these recesses 11a serves to prevent a wet fishing line from being stuck to the rod by effectively dissipating the water.

Some other embodiments of the present invention will be described.

Figure 13:
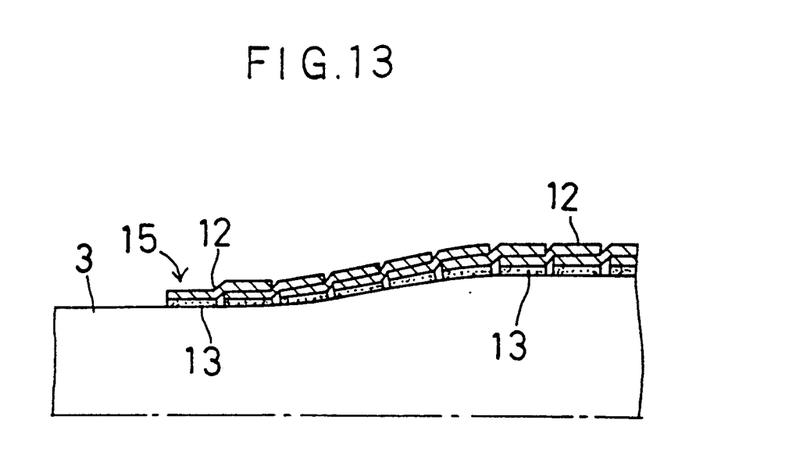
FIG. 13 is a side view in vertical section illustrating a pipe-like member forming prepreg tape relating to a still further embodiment of the invention as being wound about a mandrel.

(1) As shown in FIG. 13, it is conceivable to form the pipe-like member forming tape 15 by overlapping the prepreg tape reinforcing element 13 only on one face of the prepreg tape base 12. For winding this pipe-like member forming tape 15 about the mandrel 3, the overlapping portion where the prepreg tape reinforcing element 13 is overlapped on the prepreg tape base 12 is wound to be laid on the non-overlapped portion consisting solely of the prepreg tape base 12.

(2) The present invention may be applied to the manufacture of pipe like members other than those disclosed above, such as a pipe-like component of a small machine. Further, it is also conceivable to form a plurality of the prepreg wound layers of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of making a fishing rod, the method comprising the steps of:
    forming a tape-like prepreg by overlaying first and second fiber layers, said tape-like prepreg being elongated in a longitudinal direction, said first fiber layer being comprised of fibers aligned along said longitudinal direction, said second fiber layer being comprised of fibers aligned in a direction substantially normal to said longitudinal direction, and wherein said second fiber layer is thicker than said first fiber layer;
    supporting said tape-like prepreg on a rotary support shaft, and winding said tape-like prepreg about a mandrel with a turn of the prepreg being widthwise overlapped with an adjacent turn of the prepreg;
    applying a braking force to said rotary support shaft during said winding step so as to provide contact pressure between adjacent turns of said prepreg or between said prepreg and said mandrel;
    forming an intermediate assembly by winding a heat-contracting tape about an outermost surface of said prepreg; and
    sintering the assembly.

2. A method according to claim 1, further comprising the step of:
    winding additional turns of said prepreg about said wound prepreg in a traverse pattern to form an uneven surface.

3. A method of making a pipe-like member, comprising the steps of:
    forming a pip-like member forming tape by overlapping an elongate prepreg tape reinforcing element over an elongate prepreg tape base with said reinforcing element and said tape being longitudinally aligned to each other, said prepreg tape base being comprised of reinforcing fiber aligned along a width thereof, said reinforcing element being comprised of reinforcing fiber aligned along a length thereof and having a width shorter than a width of said tape base:
    forming in said pipe-like member forming tape, an overlapping portion where said tape base and said reinforcing element are overlapped with each other and a non-overlaping portion where said said tape base is exposed without being overlapped with said reinforcing element:
    winding said pipe-like member forming tape about a mandrel with the alignment direction of the reinforcing fiber of the prepreg tape base being slightly inclined relative to an axis of said mandrel and further with a subsequent overlapping portion of said tape being overlapped on a foregoing non-overlapped portion of said tape; and
    sintering the assembly.

4. A method according to claim 3, wherein said pipe-like member is a fishing rod.

5. A method of making a pipe-like member comprising the steps of:
    overlapping a first tape reinforcing element on an inner face of an elongate prepreg tape base with said first element and said tape being longitudinally aligned to each other, said prepreg tape base being comprised of reinforcing fiber aligned along a width thereof, said first reinforcing element being comprised of reinforcing fiber aligned along a length thereof and having a width shorter than a width of said tape base;
    overlapping a second tape reinforcing element on an outer face of said prepreg tape base with said second element and said base being longitudinally aligned to each other and at a position widthwise displaced from the overlapping position of said tape base and said first element, thereby to form a pipe-like member forming tape;
    forming in said pipe-like member forming tape, a first overlapping portion where said tape base and said first reinforcing element are overlapped with each other and a second overlapping portion where said said tape base and said second reinforcing element are overlapped with each other;
    winding said pipe-like member forming tape about a mandrel with said tape being widthwise displaced by a predetermined angle from an axis of said mandrel and further with a subsequent overlapping portion of said tape being overlapped on a foregoing non-overlapped portion of said tape; and
    sintering the assembly.

6. A method according to claim 5, further comprising the step of:
    winding a heat-contracting tape about an uppermost surface of said prepreg wound about said mandrel.

7. A method according to claim 5, wherein said width of said prepreg tape reinforcing elements is shorter than a half of a width of said prepreg tape base.

8. A pipe-like member comprising:
    an elongate prepreg tape base having unidirectionally aligned reinforcing fiber;
    an elongate prepreg tape reinforcing element having reinforcing fiber aligned in a direction normal to said alignment direction of the reinforcing fiber of said tape base and having a width shorter than a width of said tape base;
    said prepreg tape base and said reinforcing element being overlapped with each other with a longitudinal alignment and also with a widthwise overlapping therebetween so as to form a pipe-like member forming tape;
    a second elongate prepreg tape reinforcing element having longitudinally aligned reinforcing fiber and a width shorter than a width of said tape reinforcing element;
    said pipe-like member forming tape being formed by winding said second reinforcing element about an outer surface of said prepreg tape base with a longitudinal alignment therebetween and also with a widthwise displacement from an overlapping position of said foregoing reinforcing element.

9. A pipe-like member according to claim 8, wherein a heat-contracting tape is wound about an upper face of said pipe-like member forming tape.

10. A method of making a fishing rod, comprising the steps of:
    forming a fishing rod forming tape by overlapping a first tape reinforcing element on an inner face of an elongate prepreg tape base and by overlapping a second tape reinforcing element on an outer face of said prepreg tape base, with said tape base and said first and second reinforcing elements being longitudinally aligned with respect to each other, and with said first reinforcing element being displaced from said second reinforcing element in a widthwide direction; said tape base being elongated in a longitudinal direction and having a constant width and being comprised of reinforcing fibers, said reinforcing fibers of said tape base being aligned in said widthwise direction, said widthwise direction being substantially perpendicular to said longitudinal direction, and wherein the width of said first reinforcing element is less than the width of said tape base, said first reinforcing element being comprised of reinforcing fibers aligned in said longitudinal direction, and wherein the width of said second reinforcing element is less than the width of said tape base, said second reinforcing element being comprised of reinforcing fibers aligned in said longitudinal direction;

forming a first overlapping portion where said tape base and said first reinforcing element are overlapped with each other and a second overlapping portion where said tape base and said second reinforcing element are overlapped with each other;

winding said fishing rod forming tape about a mandrel with said tape being widthwise displaced by a predetermined angle such that said second overlapping portion is wound over said first overlapping portion;

forming an intermediate assembly by winding a heat-contracting tape about an outermost surface of said fishing rod forming tape; and sintering the assembly.

11. A method according to claim 10, wherein the width of said first reinforcing element is less than half of the width of said tape base, and wherein the width of said second reinforcing element is less than half of the width of said tape base.

12. A method according to claim 10, wherein a recess is formed between a first portion of said second overlapping portion and an adjacent second portion of said second overlapping portion.

13. A fishing rod comprising:
a fishing rod forming tape which includes:
 (a) an elongate prepreg tape base having a constant width and having unidirectionally aligned fibers, said fibers being aligned in a widthwise direction; and
 (b) an elongate prepreg tape reinforcing element having reinforcing fibers aligned in a longitudinal direction substantially normal to said widthwise direction, wherein the width of said reinforcing element is smaller than the width of said tape base; and wherein said fishing rod forming tape is formed by longitudinally aligning and overlapping said tape base and said reinforcing element, said fishing rod forming tape including an overlapping portion where said tape base and said reinforcing element are overlapped, said fishing rod forming tape further including a non-overlapped portion; and wherein said fishing rod is formed by winding said tape about a mandrel with said fibers of said tape base being slightly inclined relative to an axis of said mandrel, such that said tape overlaps itself.

14. A fishing rod comprising:
a fishing rod forming tape which includes:
 (a) an elongate prepreg tape base having a constant width and being comprised of reinforcing fibers, said reinforcing fibers being aligned in a widthwise direction;
 (b) a first elongate prepreg tape reinforcing element comprised of reinforcing fibers aligned in a longitudinal direction, said longitudinal direction being substantially perpendicular to said widthwise direction, and wherein the width of said reinforcing element is less than the width of said tape base; and
 (c) a second elongate prepreg tape reinforcing element comprised of reinforcing fibers aligned in said longitudinal direction, the width of said second reinforcing element being less than the width of said tape base;

wherein said tape base and said first and second reinforcing elements are all aligned in said longitudinal direction;

wherein said first reinforcing element is displaced from said second reinforcing element in said widthwise direction;

wherein said fishing rod forming tape includes a first overlapping portion where said tape base and said first reinforcing element are overlapped with each other and a second overlapping portion where said tape base and said second reinforcing element are overlapped with each other, said first reinforcing element being located on an inner face of said tape base, said second reinforcing element being located on an outer face of said tape base; and wherein said fishing rod is formed by winding said fishing rod forming tape about a mandrel with said fibers of said tape base being slightly inclined relative to an axis of said mandrel, with said second overlapping portion being wound over said first overlapping portion.

* * * * *